F. H. BILLHARTZ.
SPOKE REMOVER AND TIGHTENER.
APPLICATION FILED SEPT. 22, 1917.
1,280,646.
Patented Oct. 8, 1918.
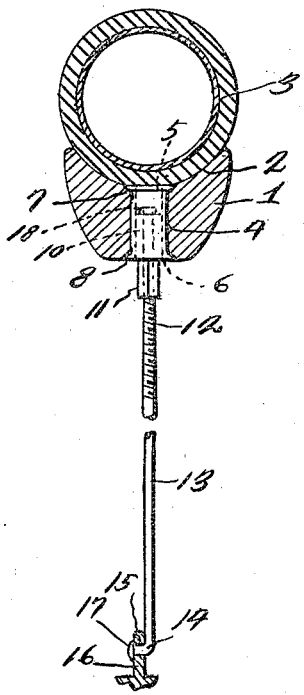
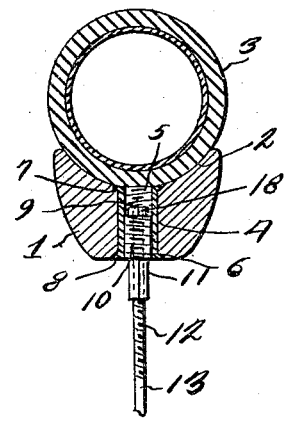
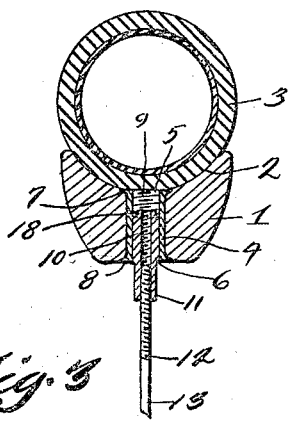
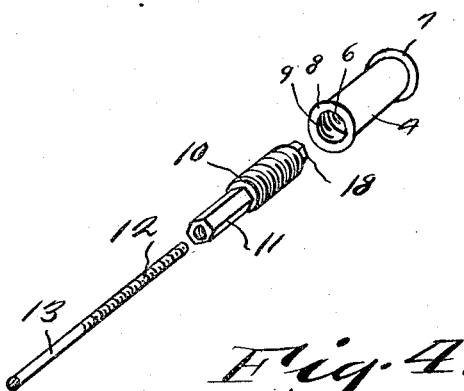
Inventor
F. H. Billhartz

UNITED STATES PATENT OFFICE.

FREDERICK H. BILLHARTZ, OF NEW BADEN, ILLINOIS.

SPOKE REMOVER AND TIGHTENER.

1,280,646.  Specification of Letters Patent.  Patented Oct. 8, 1918.

Application filed September 22, 1917. Serial No. 192,767.

*To all whom it may concern:*

Be it known that I, FREDERICK H. BILLHARTZ, a citizen of the United States, residing at New Baden, in the county of Clinton, State of Illinois, have invented a new and useful Spoke Remover and Tightener; and I do hereby declare the following to be a full, clear, and exact description of the invention, such as will enable others skilled in the art to which it appertains to make and use the same.

This invention relates to an improved spoke remover and tightener for the wire spokes of the various types of pneumatic vehicle wheels.

One of the objects of the invention is to provide an improved, efficient and practical device of this kind, consisting of very few parts, which is therefore simple and durable in construction.

A further object of the invention is the provision of a device of this kind comprising a sleeve or tubular socket open at both ends and having flanges at its ends and embedded in the rim of the wheel, in combination with an adjustable sleeve threaded to the interior of the first sleeve and provided with interior thread connections with the outer end of the spoke, whereby upon adjustment of the second sleeve in either direction, and consequently severing the threaded connections with the spoke, the spoke may be easily and readily removed.

In practical fields the details of construction may necessitate alterations falling within the scope of what is claimed.

The invention comprises further features and combination of parts as hereinafter set forth shown in the drawings and claimed.

In the drawings:—

Figure 1 is a cross sectional view of a wheel rim and a tire and a portion of a hub, showing the improved spoke remover applied.

Fig. 2 is a cross sectional view through a wheel rim, a tire thereon, and the spoke remover applied, showing the sleeve of the rim in section.

Fig. 3 is a sectional view through the rim and the tire thereon, and the spoke remover and tightener applied, showing both sleeves in section, and the spoke in elevation.

Fig. 4 is a view in perspective of the spoke and the two sleeves of the remover and tightener.

Referring more especially to the drawings 1 designates a wheel rim, which is provided with the usual channel 2 for the reception of a conventional pneumatic tire 3, and 4 denotes a tubular sleeve open at both ends, as shown at 5 and 6. Both ends of the sleeve 4 have annular exterior flanges 7 and 8. The sleeve 4 is arranged in the rim, and by means of the flanges 7 and 8, axial movement of the sleeve is prevented. The interior of the sleeve 4 is threaded as shown at 9, and engaging the threads 9 are the exterior threads of the sleeve 10. One end of the sleeve 10 is provided with an extension 11, the exterior of which is designed to be rectangular or hexagon shape in cross section, in order to be engaged by a suitable wrench (not shown), so that the sleeve 10 may be turned in one direction or the other. The interior of the sleeve 10 is also threaded, to be engaged by the exterior threads 12 of the spoke 13, the inner portion of which terminates in a right angle extending part 14 to enter the opening or aperture 15 of the flange 16 of a part of a wheel hub. The end of the right angle part 14 has a head 17 to prevent movement of the part 14 in one direction, while the body of the spoke engaging the flange 16 prevents movement of the part 14 in the opposite direction. The outer end of the sleeve 10 has an extension 18, the exterior of which is rectangular or hexagon shape in cross section, to be engaged by a wrench (not shown). It is to be observed that by applying a wrench to the extension 11, turning the sleeve 10 in one direction, in fact turning it so as to feed it toward the inner end of the spoke, until the sleeve is entirely disconnected from the sleeve 4, and being that the outer end of the spoke does not quite reach the inner end of the sleeve 4, the spoke may be easily removed. For instance after disconnecting the sleeve 10 from the sleeve 4, and then turning the sleeve 10 off the spoke 13, said spoke may be manipulated, whereby its body may pass through the opening 15 of the flange 16, until it is entirely disconnected from the hub. However, if desired the sleeve 10 may be rotated whereby it may move outwardly on the spoke 13 to act as means for tightening the spoke. By using a wrench that will enter the outer end of the sleeve 4 sufficiently to engage the extension 18, that is when the tire 3 is removed, the sleeve 10 may be rotated to move outwardly on the spoke 13.

The invention having been set forth, what is claimed as new and useful is:—

The combination with a wheel rim, of an open ended sleeve having means at its opposite ends, whereby said sleeve is fixed radially in the rim, a spoke having its inner end connected to the hub of the wheel, and having threads at its outer end, a second sleeve having its inner end interiorly threaded to connect to the threads of the spoke, the outer end portion of the second sleeve being enlarged and provided with exterior threads to thread into the first sleeve, whereby the second sleeve may be adjusted through the first sleeve through either of its ends, and a part or member hexagonal in cross section integral with each end of the second sleeve, whereby the second sleeve may be rotated in one direction or the other.

In testimony whereof I have signed my name to this specification in the presence of two subscribing witnesses.

FREDERICK H. BILLHARTZ.

Witnesses:
EDW. BALL,
WM. LINCK.

Copies of this patent may be obtained for five cents each, by addressing the "Commissioner of Patents, Washington, D. C."